United States Patent [19]

Meek et al.

[11] 4,201,033
[45] May 6, 1980

[54] DISC MOWERS

[76] Inventors: Nigel W. Meek, Madges, Long Crendon; John Robb, Myitkyina, Main St., Grendon Underwood; James A. Munro, 39 Elm Trees, Long Crendon, all of Aylesbury, Buckinghamshire, England

[21] Appl. No.: 934,246

[22] Filed: Aug. 16, 1978

[30] Foreign Application Priority Data

Aug. 18, 1977 [GB] United Kingdom ............... 34640/77

[51] Int. Cl.² ...................... A01D 55/26; A01D 55/18
[52] U.S. Cl. .......................................... 56/13.6; 56/295
[58] Field of Search ................... 56/295, 6, 13.6, 17.4

[56] References Cited

U.S. PATENT DOCUMENTS

| 3,507,306 | 4/1970 | Kline et al. | 56/13.6 X |
| 3,524,306 | 8/1970 | Reber | 56/17.4 X |

FOREIGN PATENT DOCUMENTS

| 1484044 | 5/1967 | France | 56/295 |
| 1520653 | 3/1968 | France | 56/295 |
| 91542 | 5/1968 | France | 56/295 |
| 2332694 | 11/1976 | France | 56/295 |
| 1147813 | 4/1969 | United Kingdom | 56/295 |

Primary Examiner—Russell R. Kinsey
Attorney, Agent, or Firm—Larry W. Miller; Frank A. Seemar; John B. Mitchell

[57] ABSTRACT

A disc mower which is silent in operation and simple to maintain. The mower comprises a casing (1) on top of which is mounted at least one pair of rotatable cutter discs (8) driven by a belt transmission (9) housed within the casing (1). The casing (1) has a base portion (3) and an upper portion (2) hingedly connected together along one edge and releasably secured together by a plurality of skids (33-37) which in use are contactable with the ground to support the mower.

13 Claims, 17 Drawing Figures

DISC MOWERS

BACKGROUND OF THE INVENTION

This invention relates to mowers and more particularly to so-called disc mowers in which knives are mounted at the peripheries of cutter discs which are rotable at relatively high speed so as to cut standing crop by impact as opposed to shearing.

Disc mowers invariably have knife-carrying discs mounted on top of a relatively shallow casing which houses the drive mechanism for the discs. The thus bottom-driven discs have an uninterrupted upper surface over which cut crop can flow to be deposited in a windrow to the rear of the mower which is advantageous. To date the discs have been driven through a gear train contained within the casing which thus has to be filled with lubricating oil. A number of disadvantages flow from this arrangement: the use of a precision gear train is relatively expensive in production and maintenance, maintenance is not made easy by the need to empty the casing of oil before being able to work on the gear train and other components housed in the casing, and the mower is noisy in operation.

SUMMARY OF THE INVENTION

The object of the present invention is to reduce or eliminate one or more of these disadvantages.

According to the present invention a disc mower comprises a casing on top of which is mounted at least one pair of rotatable cutter discs, with each cutter disc carrying at least one generally radially-extending knife at its periphery, and a transmission belt housed within the casing and operable to drive the discs, the casing having a base portion and an upper portion hingedly connected together along one edge and releasably secured together along the opposite edge by a plurality of skids which in use are contactable with the ground to support the mower.

The skids may be made to hook over the upper portion of the casing and be releasably attached, such as by bolts, to the base portion of the casing.

Preferably a gearbox is mounted on top of the casing and is operable to drive the transmission belt. The transmission belt may be arranged to drive the cutter discs of each pair of in opposite directions and the tension in the belt may be adjusted automatically to accomodate belt stretch and wear. Belt tension adjustment may be effected by passing the belt around two idler pulleys mounted within the casing on a pivotal arm which is biassed in a direction such as to take up any slack in the belt arising from belt stretch or belt wear and thereby maintain a substantially constant tension in the belt. The initial belt tension may be adjustable.

It is desirable to arrange for the paths of the knives of adjacent cutter discs to overlap so that a continuous swath of crop is cut across the whole width of the mower without leaving any uncut strips of crop (referred to as "stripping" in the art). However, this means that care has to be taken to ensure that knives of adjacent cutters cannot foul each other. With the known use of a gear train to drive the cutter discs, this is easily accomplished because the gears can be used to "time" each disc so that a knife of one never arrives at the overlap region at the same time as a knife of an adjacent disc. Whilst initial "timing" may be achieved with a transmission belt drive it can never be guaranteed because belt slip easily occurs and, therefore, in a preferred embodiment of the present invention each cutter disc comprises an upper disc member and a lower disc member with each knife of one cutter disc being mounted between the upper and lower disc members and positioned immediately adjacent one disc member and spaced from the other disc member by at least one knife thickness, and with each knife of each adjacent cutter disc being immediately adjacent the corresponding other disc member and spaced by at least one knife thickness from the one disc member. In this way, the cutter discs themselves do not have to be offset to achieve knife clearance at the overlap region and knife maintenance is readily accomplished merely by removing the upper disc member.

Consequential to the requirement of knife path overlap for adjacent cutter discs, the front edge of the casing on which the cutter discs are mounted has to be scalloped and in order to reduce the magnitude of this scalloping to aid manufacture, the diameter of the cutter discs is made as small as possible, consistent with a sufficiently high cutter speed. However, it is desirable to provide a crop divider at the outer end of the mower to deflect cut crop inwardly of the mower so that a space is cleared for the passage of the tractor wheels, or other implement carrying the mower, during the next pass and this is often in the form of a rotary drum mounted on, and rotatable with, the outermost cutter disc. With the use of a relatively small diameter cutter disc, the size and speed of the crop divider if mounted on the outermost cutter disc in the normal way would be such as to reduce, if not destroy, the function of the crop divider. In accordance with a preferred feature of the present invention, a rotary crop divider of a diameter larger than that of the cutter discs is mounted on top of the mower casing rearwardly of the outermost cutter disc and driven by the belt transmission at a rotational speed slower than that of the cutter discs.

BRIEF DESCRIPTION OF THE DRAWINGS

A disc mower constructed in accordance with the present invention will now be described in greater detail, by way of example, with reference to the accompanying drawings, in which.

DETAILED DESCRIPTION OF THE PREFERRED EMBODIMENT

Figure 6:
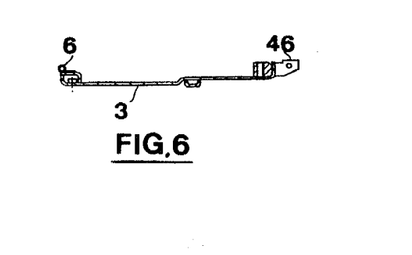
FIG. 6 is a section on the line VI—VI of FIG. 5.
Figure 7:
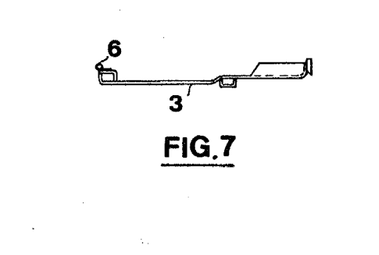
FIG. 7 is a view in the direction of arrow VII in FIG. 5.

The mower comprises a closed drive transmission casing 1 having an upper portion 2 (best seen in FIG. 1) and a base portion 3 (best seen in FIG. 5) and serving to carry all the major components of the mower as will be explained. The direction of movement of the mower when in operation is indicated by the arrow 4 in the drawings and the terms "left-hand" and "right-hand" as used herein are derived by facing in the direction of arrow 4. The rear edge of the upper portion 2 of the casing is provided with a series of spaced half hinges 5 (FIG. 2) which cooperates with spaced half hinges 6 (FIGS. 6 and 7) provided on the rear edge of the base portion 3, the hinge being completed by a hinge pin 7 (FIG. 8) and thus being of the piano type and extending along the major part of the casing 1 although terminating short of the right-hand end.

Figure 9:
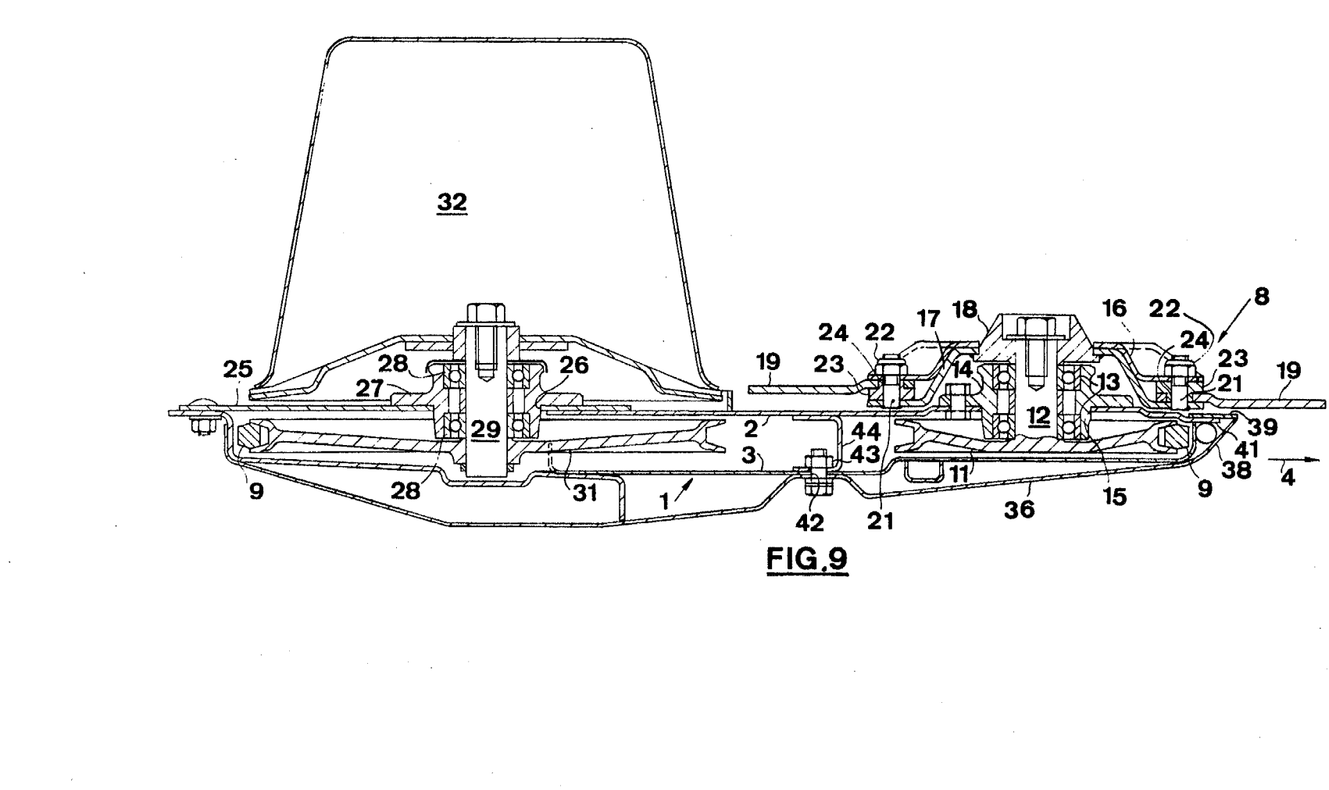
FIG. 9 is a cross-section of the complete mower at a point indicated by line IX—IX in FIG. 1.

Six rotary cutter discs 8 (FIG. 9) are mounted on the casing 1 towards the front edge thereof and are driven by a belt transmission housed within the casing and comprising a conventional drive belt 9 of hexagonal cross section and a series of pulleys. Each cutter disc 8 has a drive pulley 11 with an integral shaft 12 mounted in a pair of bearings 13 contained in a bearing housing 14 bolted to the casing upper portion 2 and extending through an aperture 15 therein. Each cutter disc 8 further comprises an upper disc member 16 and a lower disc member 17 both of which are dished and generally circular in plan view, with the two members being vertically spaced apart at their peripheries. The lower disc member 17 is welded to a central member 18 bolted to the shaft 12. Between the spaced peripheries of the upper and lower disc members 16 and 17 are mounted two diametrically-opposed, double-edged knives 19 which extend generally radially from the cutter disc as seen in FIG. 9. Each knife 19 is mounted on a pivot pin 21 welded to the lower disc member 17 and is secured by a lock nut 22 which also serves to hold the upper disc member 16 in position. The two knives 19 of a given cutter disc 8 are located either immediately adjacent the underside of the upper disc member 16 or immediately adjacent the upper side of the lower disc, whereby the paths of the knives of adjacent cutter discs can overlap without the respective knives fouling each other. For ease of illustration, one knife 19 in FIG. 9 is shown mounted in one manner with the other knife mounted in the alternative manner as would pertain on each adjacent cutter disc but it is emphasised that each knife of a given cutter disc 8 is mounted in one and the same manner. The alternative mountings are accomplished very simply by a spacer 23 having a main body portion of a thickness greater than that of the knives 19 and a central boss 24 over which the corresponding knife fits. Merely by reversing the spacer 23, the corresponding knife is either located immediately adjacent the underside of the upper disc member 16 and spaced from the lower disc member 17 or immediately adjacent the upper side of the lower disc member 17 and spaced from the upper disc member 16.

Figures 1, 2, 3, 4:
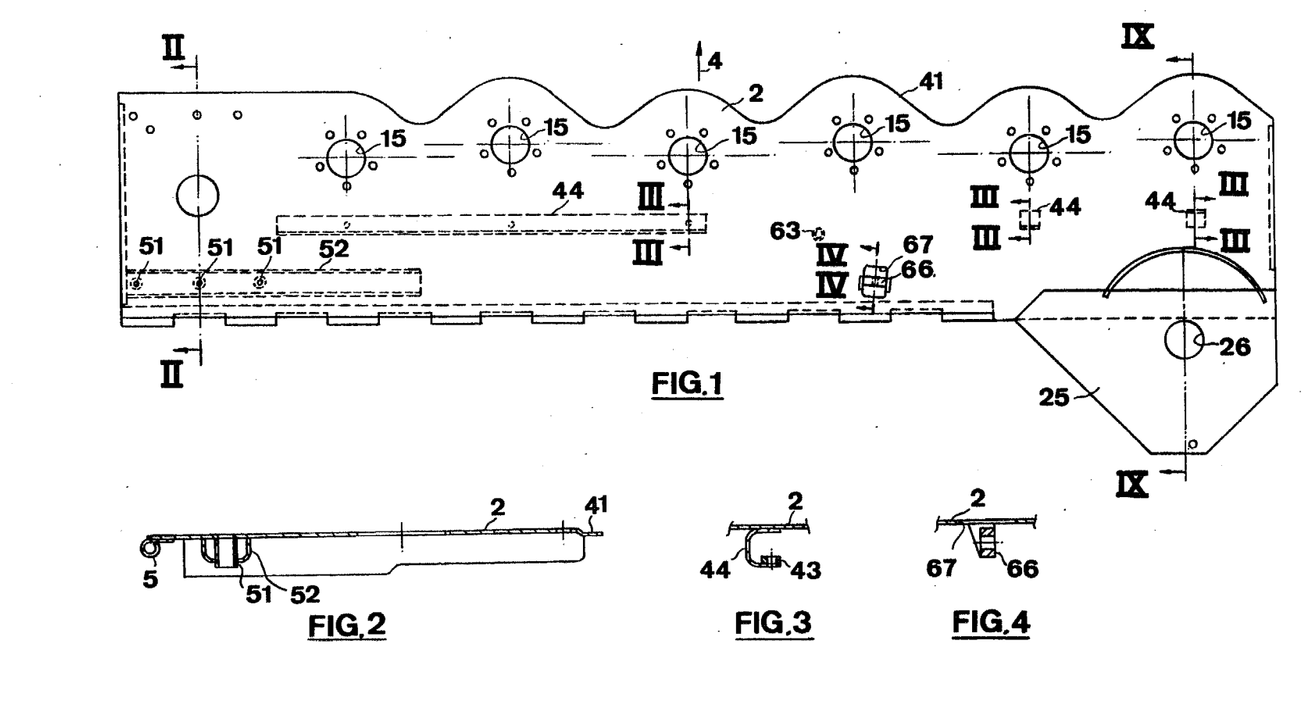
FIG. 1 is a plan view of the upper portion of a casing containing the drive transmission for the mower.
FIGS. 2, 3 and 4 are sections to an enlarged scale on lines II—II, III—III and IV—IV, respectively of FIG. 1.

From the positions of the apertures 15 shown in FIG. 1 it will be seen that the cutter discs 8 are spaced along the casing 1 and that the centre line of alternate discs is offset slightly towards the front edge of the casing 1 in relation to the centre line of the remaining discs. In this way, belt wrap-around in respect of the drive pulleys 11 is increased to advantage. Over the length of the casing 1 occupied by the cutter discs 8 the front edges of both the upper portion 2 and base portion 3 are scalloped to enable the paths of the knives 19 of adjacent cutter discs to overlap in free space otherwise "stripping" results as discussed hereinbefore. The "amplitude" of alternate scallops is such as to accommodate the offset cutter discs and it will be noted that the "troughs" of the scallops are relatively curvaceous which aids manufacture. This is achieved by using cutter discs having a knife path diameter of about 345 mm. With a knife overlap of about 40 mm. The larger the cutter discs 8, the deeper and less curvaceous are the troughs of the scallops of the front edges of the casing portions 2 and 3 which hinders manufacture and weakens the casing 1.

The upper portion 2 of the casing 1 has a rearward extension at the right-hand end by way of a mounting plate 25 having an aperture 26 accomodating a bearing housing 27 having a pair of bearings 28 therein for rotatably supporting a shaft 29 to the lower end of which is attached a pulley 31 driven by the transmission belt 9. A rotary crop divider drum 32 is mounted on the upper end of the shaft 29 for rotation thereby, the crop divider serving in use of the mower to deflect cut crop inwardly of the mower for the reason explained above. It will be noted that the diameter of the crop divider drum 32 (about 290 mm.) is greater than that of the cutter discs 8 and that the drive pulley 31 therefor is larger than the drive pulleys 11 for the cutter discs so that the drive speed is lower, being of the order of 2500 r.p.m. as opposed to 4300 r.p.m. for the cutter discs.

Figure 10:
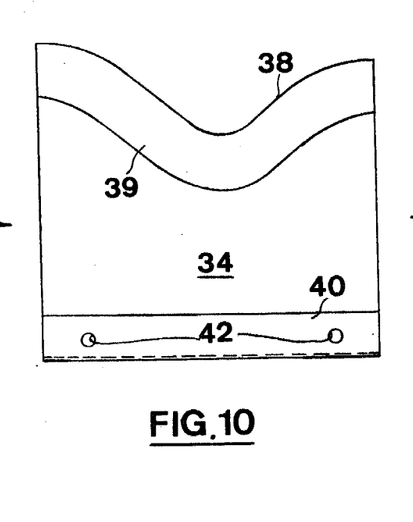
FIG. 10 is a plan view of a skid of the mower.
Figure 11:
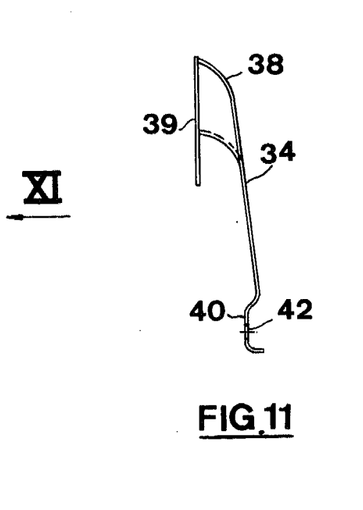
FIG. 11 is a part view in the direction of arrow XI of FIG. 10.
Figure 12:
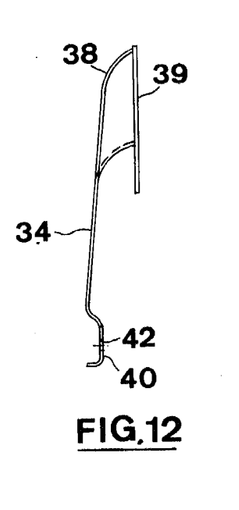
FIG. 12 is a view in the direction of arrow XII of FIG. 10.
Figure 13:
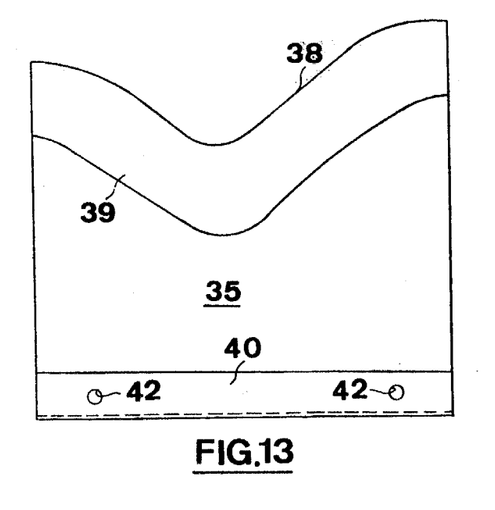
FIG. 13 is a plan view of another skid of the mower.
Figure 14:
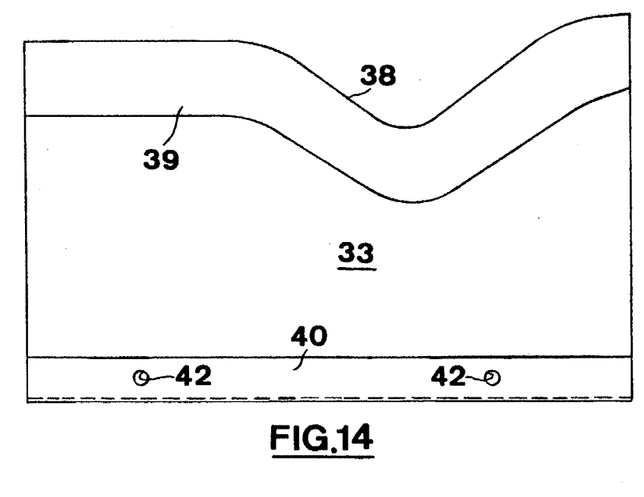
FIG. 14 is a plan view of a further skid of the mower located at the extreme left-hand end as viewed in FIG. 1.

Whilst the rear edges of the upper and base portions 2 and 3 of the casing 1 are secured together by the hinge 5, 6, 7, the front edges are clipped together by a series of abutting members which also acts as skids for the mower. FIG. 14 shows a skid 33 which extends beneath the casing 1 from just left of the extreme left-hand cutter disc 8 to half-way across the adjacent cutter disc. FIG. 10 shows the next skid 34 which abuts the skid 33 and extends half-way across the third-from-left cutter disc 8 and abuts the next skid 35 shown in FIG. 13 which in turn extends half-way across the fourth-from-left cutter disc. Then another skid similar to skid 34 is provided and finally a skid 36 (FIG. 9) is provided between the second skid 34 and the right-hand end of the casing 1. At the extreme left-hand end of the casing another skid 37 (FIG. 8) is provided.

The skids 33, 34, 35 and 36 are of the same general construction, allowing for the differences in shapes of the front edges to suit the respective positions along the casing 1. They are of sheet metal and each has a smoothly curved, upturned front edge 38 with a return plate 39 welded thereto to provide in effect a hooked front end which fits over the front edge 41 of the upper portion 2 of the casing 1 as seen in FIG. 9 in respect of skid 36. The skids 33, 34 and 35 each have an apertured recessed portion 40 along the rear edge, the apertures 42 taking bolts which are received by threaded members or nuts 43 attached to a U-section member 44 welded to the underside of the upper portion 2 as seen in FIGS. 1 and 3.

The members 44 are formed as a continuous channel to the left of the centre of the upper portion 2 of the casing 1 which helps to strengthen the latter. Other components do not permit the continuous channel to extend the full length of the mower. The right-hand skid 36 is extended rearwardly, in relation to the other skids, to cover the crop divider mounting plate 25 and pulley 31 mounted therebeneath as seen in FIG. 9. The rear edge of the skid 36 is bolted to the rear edge of the mounting plate 25 in addition to the intermediate attachment to a corresponding U-section member 44.

Figure 5:
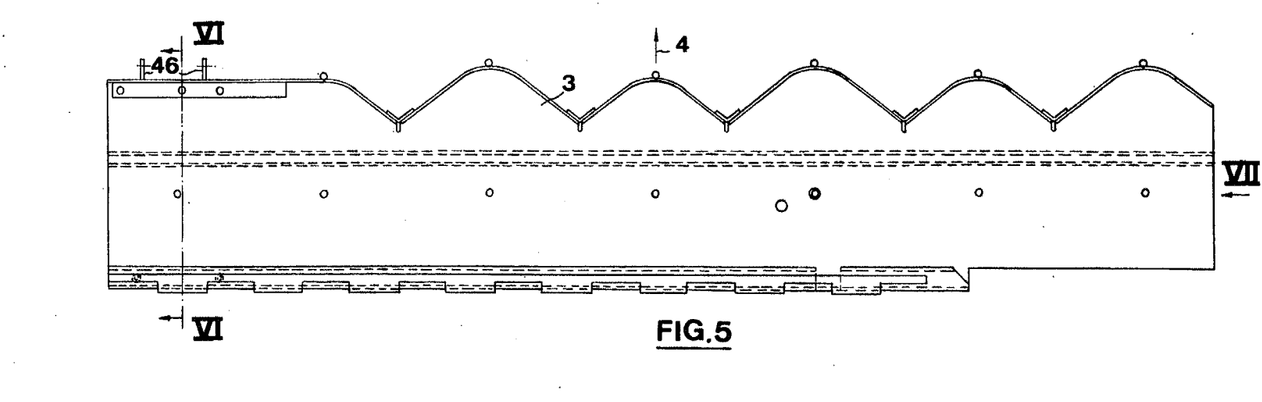
FIG. 5 is a plan view of the base portion of the drive transmission casing.
Figure 8:
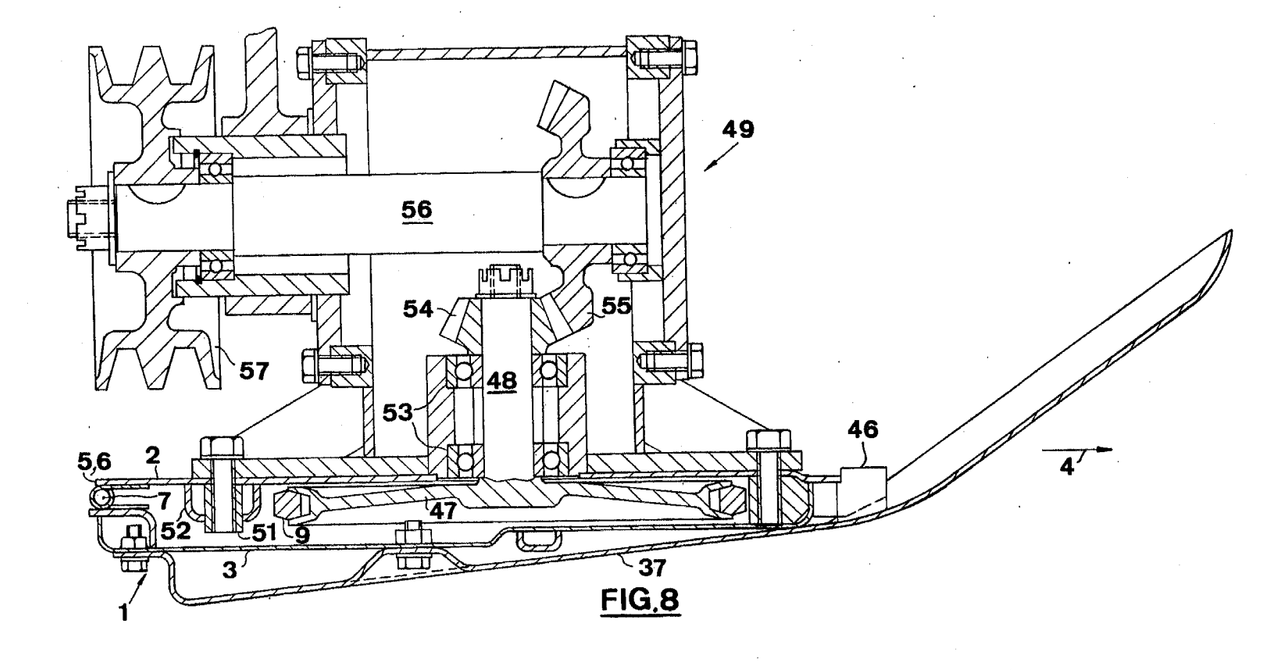
FIG. 8 is a partial cross-section of the complete mower at a point generally similar to that indicated by line II—II in FIG. 1.

The extreme left-hand skid 37 is also secured in position in front, rear and intermediate locations although the attachment at the front edge is not by hooking over the front edge of the casing 1 as with the other skids, but by the use of brackets 46 attached to the base portion 3 of the casing 1 (FIGS. 5 and 8). The front edge of the skid 37 is upturned, as with the others, but is also considerably extended so as to facilitate the riding over ground irregularities and previously cut crop.

The transmission belt 9 is driven by a pulley 47 housed within the casing 1 and attached to an output shaft 48 of a gearbox 49 mounted on top of the casing. The pulley 47 has a diameter of about 230 mm. (i.e. larger than the drive pulleys 11 for the cutter discs 8) and is driven at about 3170 r.p.m. from which the drive speeds for the pulleys 11 (4300 r.p.m.) and 31 (2500 r.p.m.) are derived. The gearbox 49 is bolted to both the upper portion 2 and base portion 3 of the casing at the front of the mower but to the upper portion 2 only at the rear, as seen in FIG. 8, with threaded members 51 being provided in a continuous U-section channel 52 on the underside of the upper portion 2 for the latter purpose (FIGS. 1, 2 and 8).

The output shaft is supported in a pair of bearings 53 and has the drive pulley 47 attached at one end with the distal end carrying a bevel pinion 54 which meshes with a bevel gear 55 carried by an input shaft 56. The input shaft 56 also carries an input pulley or sheave 57 which in use is driven from the power-take-off of a tractor or other vehicle through a belt (not shown).

Figure 15:
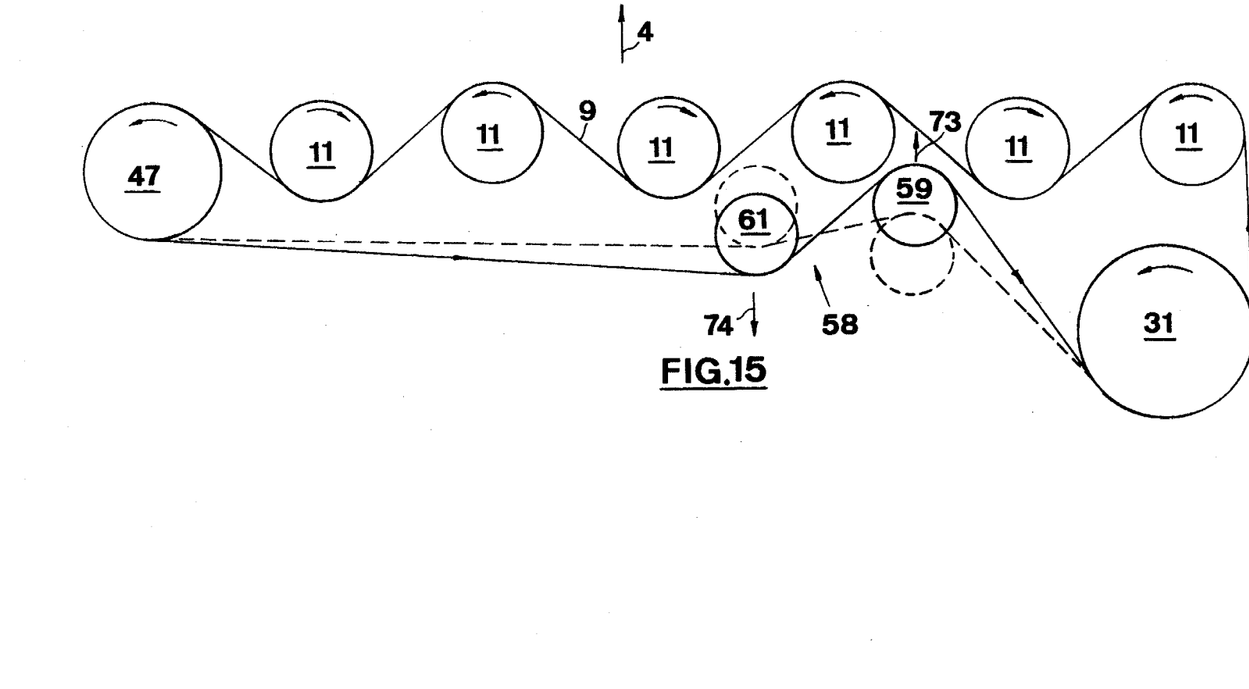
FIG. 15 is a schematic layout of the drive transmission within the transmission casing of the mower.

The drive configuration of the transmission belt 9 is shown in FIG. 15 and it will be seen that the arrangement is such that the cutter discs 8 of each pair are driven in opposite directions, whereby both discs of the pair are moving rearwardly of the mower when passing through the overlap region, and such that the crop divider drum 32 rotates in the appropriate direction. Clearly, there is a need to maintain a substantially constant tension in the belt 9 and adjustable belt-tensioning means 58 (FIGS. 16 and 17) are provided to this end because otherwise, the belt tension would decrease due to belt stretch and wear. The belt-tensioning means 58 comprise two idler pulleys 59, 61 around which the belt 9 passes and which are mounted on a pivotal arm 62. A pivot pin 63 for the arm 62 is mounted on the underside of the upper portion 2 of the casing 1 and is offset from the center of the arm. Connected to the arm 62 intermediate the pivot pin 63 and the pulley 59 (furthest from the pivot pin) is a plate 64 to which is secured one end of a threaded rod 65 (FIG. 16) the other end of which is freely movable within an aperture in a guide plate 66 attached to the underside of the upper portion 2 of the casing 1 and accessible through an opening 67 therein as seen in FIG. 1. The rod 65 is biassed towards the arm 62 by a compression spring 68 through which the rod passes, the spring acting between the guide plate 66 and a washer 69 adjustably positioned on the rod by a nut 71 and a lock nut 72.

Figure 16:
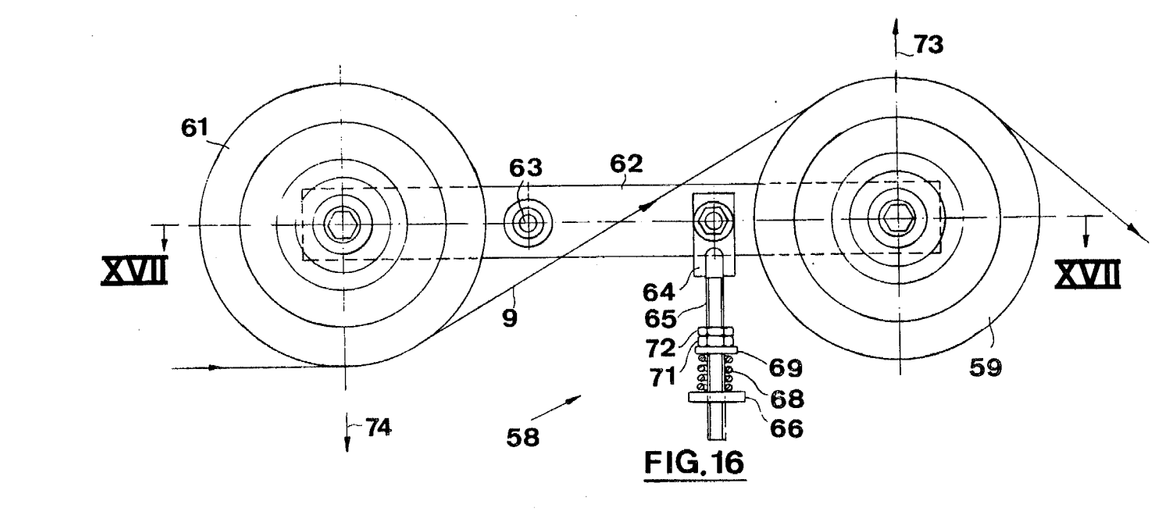
FIG. 16 is an enlarged detail of FIG. 15.
Figure 17:
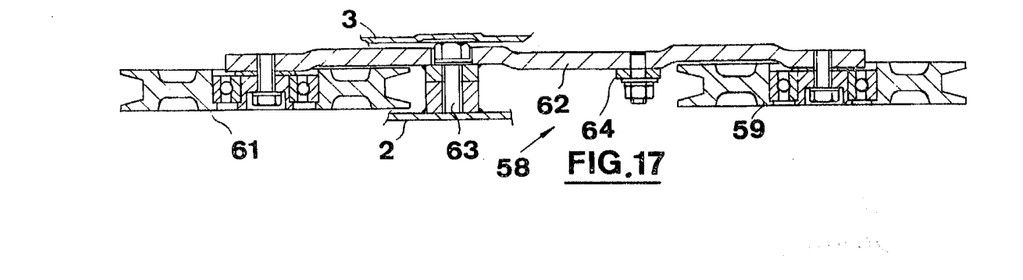
FIG. 17 is a section on the line XVII—XVII of FIG. 16.

As the belt 9 stretches or wears in use, the slack thereby created is taken up by the pulley 59 moving towards the front of the mower and the pulley 61 moving to the rear, as indicated by the respective arrows 73 and 74 in FIGS. 15 and 16, these pulley movements resulting from the action of the spring 68. Thus there is automatic adjustment of the tension in the belt 9 to maintain the same substantially constant. However, the belt stretch and wear may be such that the spring 68 is extended to an extent that makes it less effective and a basic readjustment may then be made by slackening the lock nut 72 and then adjusting the position of the nut 71 to move the washer 69 towards the guide plate 66. This adjustment can be made through the opening 67 in the upper portion 2 of the casing 1. An indication of the initial positions of the components of the tensioning means 58 is shown in broken lines in FIG. 15 with the full line positions resulting from the operation of the tensioning means.

In use the mower is suspended from a tractor or other vehicle via a convential linkage (not shown) and held close to the ground to enable as low a cut as possible to be made. Should the mower touch down onto the ground due to irregularities, the skids 33–36 and 45 support the mower. The mower is extremy silent in operation which reduces considerably operator fatigue and the comparatively simple construction is cost effective. As already described, any basic adjustment in belt tension can be made from the top of the mower and if any maintenance or changing of the knives 19 is required, this is readily accomplished merely by unbolting the upper disc member 16 of the cutter disc 8 in question. If access to the casing 1 is required for maintenance or repair purposes, all that is necessary is for the skids 33–37 to be removed by unbolting them from beneath the mower and, where appropriate, unhooking them from the edge of the casing 1. In addition, the bolts at the front of the gearbox 49 securing the latter to both the upper portion 2 and base portion 3 of the casing 1 have to be removed and then the base portion can be swung away from the upper portion about the hinge 5, 6, 7 whereby full access to all the components housed in the casing can be obtained. The fact that the casing 1 does not have to be filled with oil as in case of known mowers having cutter discs driven by a gear train is particularly beneficial to maintenance/repair procedure.

Having thus described the invention, what we claim is:

1. A disc mower comprising:
   (a) a casing of generally elongate shape and when in the operative position extending generally transverse to the intended direction of operative travel;
   (b) at least one pair of rotatable cutter discs mounted on top of the casing and operably extending therewithin;
   (c) at least one generally radially-extending knife carried by each cutter disc at the periphery thereof;
   (d) a transmission belt housed within the casing and co-operable with said cutter discs for driving operation thereof;
   (e) said casing comprising a base portion and an upper portion hingedly connected together along one edge and
   (f) a plurality of skid means engageable with the opposite edge of the base portion and upper portion of the casing for releasably securing said base portion and upper portion together along said edge opposite to the hinge edge, the skid means when in use being contactable with the ground to support the mower.

2. A disc mower according to claim 1, wherein each skid means comprises a hooked end engageable with the front edge of the casing and provided with means for attachment to the base portion of the casing.

3. A disc mower according to claim 2, wherein the attachment means for attaching the skid means to the casing includes a threaded member carried by the interior of the casing and a bolt being received by said threaded member.

4. A disc mower according to claim 3, wherein the casing comprises a U-shaped member attached to the underside of the upper portion thereof, the U-shaped member carrying the threaded member; the bolt received by the threaded member extending through an aperture in the base portion.

5. A disc mower according to claim 4, wherein a plurality of U-shaped members are provided each carrying a threaded member for receiving a bolt, and wherein at least some of the U-shaped members are formed by a continuous channel also serving to strengthen the casing.

6. A disc mower according to claims 4 or 5 wherein, when the base portion and upper portion are secured together, said base portion abuts against said U-shaped member.

7. A disc mower comprising:
(a) a casing of generally elongate shape and when in the operative position extending generally transverse to the intended direction of operative travel;
(b) the casing having a base portion and an upper portion hingedly connected together along one elongate edge;
(c) at least one pair of spindles rotatably mounted in the upper portion and having opposite ends at opposite sides of said upper portion;
(d) a cutter disc mounted on one end of each spindle and positioned above the upper portion of the casing when in the operative position;
(e) at least one generally radially-extending knife carried by each cutter disc at the periphery thereof and with its trajectory projecting in front of the forward edge of the casing;
(f) a drive pulley secured to the opposite end of each spindle and at the side of the upper portion of the casing opposite to the side facing the cutter discs;
(g) a transmission belt housed within the casing and passing around said pulleys for driving the discs;
(h) a plurality of skid means with hooked edges at one side thereof, the hooked edges engageable with the elongate edge of the base portion and the upper portion opposite to the hinged edge for releasably securing the base portion and the upper portion together along said opposite edge of the base portion and upper portion; the skid means when in use being contactable with the ground to support the mower, and
(i) fastening means for releasably attaching the skid means to the casing at a location spaced from the hooked edges on the skid means and from said opposite edge of the base portion and upper portion.

8. A disc mower according to claim 7, wherein means are provided for maintaining a substantially constant tension in the transmission belt, the means comprising:
a pivotal arm mounted within the casing;
a pair of idler pulleys rotatably mounted on the pivotal arm and engaged by the transmission belt, the pivotal arm with the idler pulleys thereon biassed in a direction such as to compensate for any slack in the transmission belt arising from belt stretch or belt wear,
adjustment means having a member attached to the pivotal arm and offset from the pivot axis of the arm, a threaded rod attached at one end to said member with the other end engaging a fixed guide member, a stop member and locknut assembly carried by the rod, and a compression spring mounted between the stop member and the guide member, the compression spring being operable to effect said bias of the pivotal arm and the stop member being movable, on adjustment of the locknut assembly, relative to the guide member to effect basic adjustment of the belt tension.

9. A disc mower according to claim 7, wherein each cutter disc comprises an upper disc member and a lower disc member with each knife of one cutter disc being mounted between the upper and lower disc members and positioned immediately adjacent one disc member and spaced from the other disc member by at least one knife thickness, and with each knife of each adjacent cutter disc being immediately adjacent the corresponding other disc member and spaced by at least one knife thickness from the one disc member.

10. A disc mower according to claim 11, wherein each knife is spaced from the upper or lower disc member, as required, by a spacer.

11. A disc mower according to claim 7, wherein the front edge of the casing is scalloped with alternate undulations being smaller than adjacent undulations and with the centre line of alternate cutter disc associated with said alternate undulations being offset relative to the centre line of the other cutter discs away from the front of the casing.

12. A disc mower according to claim 7, 8, 9 or 11, further also comprising a rotary crop divider which is mounted on the casing rearwardly of the outermost cutter disc and rotatable by the belt transmission at a rotational speed slower than that of the cutter discs.

13. A disc mower according to claim 12 further also comprising a skid which extends beneath both the outermost cutter disc and the crop divider.

* * * * *